United States Patent
Sanford

(10) Patent No.: US 9,375,668 B2
(45) Date of Patent: Jun. 28, 2016

(54) AIRCRAFT CABIN TEMPERATURE SENSOR FILTER

(75) Inventor: Scott Sanford, St. Petersburg, FL (US)

(73) Assignee: Heico Corp., Hollywood, FL (US)

( * ) Notice: Subject to any disclaimer, the term of this patent is extended or adjusted under 35 U.S.C. 154(b) by 1864 days.

(21) Appl. No.: 12/729,939

(22) Filed: Mar. 23, 2010

(65) Prior Publication Data

US 2010/0237155 A1    Sep. 23, 2010

Related U.S. Application Data

(60) Provisional application No. 61/162,407, filed on Mar. 23, 2009.

(51) Int. Cl.
  *B01D 46/00*    (2006.01)
  *B01D 46/10*    (2006.01)
  *B64D 13/00*    (2006.01)

(52) U.S. Cl.
  CPC ............ *B01D 46/10* (2013.01); *B01D 46/0005* (2013.01); *B01D 2279/50* (2013.01); *B64D 13/00* (2013.01); *Y10T 29/53* (2015.01)

(58) Field of Classification Search
  CPC ...... B64D 13/00; B64D 13/003; B01D 46/10; B01D 46/005; B01D 2279/50
  USPC ........ 62/85, 186, DIG. 5; 236/49.3, 51, 93 R; 244/118.5, 53 B, 53 R; 454/71; 374/208, 374/141, 109, 29, 30, 137, 135, 163; 55/385.6, 496, DIG. 31, 497, 500, 506
  See application file for complete search history.

(56) References Cited

U.S. PATENT DOCUMENTS

| | | | | |
|---|---|---|---|---|
| 2,553,512 | A | * | 5/1951 | Cotton, Jr. ............. B64D 33/02 244/1 R |
| 2,864,462 | A | * | 12/1958 | Brace ...................... A47L 5/362 55/367 |

(Continued)

OTHER PUBLICATIONS

Brady. Air Conditioning. May 16, 2008. [Retrieved on Apr. 30, 2010]. Retrieved from the Internet:<URL: http://www.b737.org. uklairconditioning.htm>. p. 2. para [0001], [0002], photo 01.*

(Continued)

*Primary Examiner* — Allen Flanigan
*Assistant Examiner* — Kun Kai Ma
(74) *Attorney, Agent, or Firm* — Hahn Loeser & Parks, LLP

(57) ABSTRACT

A method and apparatus are provided for detecting a temperature of a cabin within an airplane. The method includes the steps of providing a temperature sensor, enclosing the temperature sensor within an enclosure, coupling an inlet of the enclosure to the cabin of the airplane and an outlet to an air conditioning air return of the airplane and disposing a filter over the inlet.

In another aspect, the apparatus includes a mounting plate having a center aperture, a curved profile in a first direction to conform to a vertical curve on a spacer between adjacent overhead luggage bins of an aircraft and a width in a second direction that fits between doors of the overhead luggage bins, a U-shaped bezel that engages the mounting plate, the bezel defining a pair of notches between the bezel and mounting plate along opposing inside edges of a pair of upright arms of the U-shaped bezel and a filter cartridge with a pair of opposing flanges that engages the notches and a filter media over a central portion that covers the aperture in the mounting plate.

3 Claims, 5 Drawing Sheets

(56) References Cited

U.S. PATENT DOCUMENTS

| | | | | |
|---|---|---|---|---|
| 4,742,760 | A * | 5/1988 | Horstman | B64D 13/00 244/118.5 |
| 5,639,287 | A * | 6/1997 | Van de Graaf | B01D 46/0005 55/385.3 |
| 5,679,121 | A * | 10/1997 | Kim | F24F 1/022 55/481 |
| 5,679,122 | A * | 10/1997 | Moll | B01D 46/0005 210/493.3 |
| 5,725,622 | A | 3/1998 | Whitson et al. | |
| 6,024,639 | A | 2/2000 | Scherer et al. | |
| 6,241,794 | B1 * | 6/2001 | Jadran | B01D 46/0004 55/480 |
| 6,284,010 | B1 | 9/2001 | Rehmert et al. | |
| 6,551,184 | B1 * | 4/2003 | Mayer | B64D 11/06 454/120 |
| 6,793,715 | B1 * | 9/2004 | Sandberg | B01D 46/10 55/486 |
| 7,364,602 | B2 * | 4/2008 | Wu | B01D 46/0005 200/61.51 |
| 8,163,050 | B2 * | 4/2012 | Belyew | B01D 46/0002 244/53 B |
| 8,899,227 | B2 * | 12/2014 | Billingsley | A62B 7/10 128/201.25 |
| 2006/0237585 | A1 * | 10/2006 | Lau | B60Q 3/025 244/118.5 |
| 2008/0251640 | A1 * | 10/2008 | Johnson | B64D 11/003 244/118.1 |
| 2008/0296075 | A1 * | 12/2008 | Zhu et al. | 180/68.1 |
| 2009/0019824 | A1 * | 1/2009 | Lawrence | B01D 46/0004 55/497 |
| 2009/0311951 | A1 * | 12/2009 | Walkinshaw | B60H 3/0007 451/261 |
| 2010/0038482 | A1 * | 2/2010 | Johnson | 244/118.1 |
| 2010/0087131 | A1 * | 4/2010 | Stuetzer | B64D 11/003 454/76 |
| 2010/0107576 | A1 * | 5/2010 | Belyew | B01D 46/0002 55/306 |
| 2010/0240290 | A1 * | 9/2010 | Markwart | B64D 13/00 454/71 |

OTHER PUBLICATIONS

Brady. Air Conditioning. May 16, 2008. [Retrieved on Apr. 30, 2010], Retrieved from the Internet: <URL: http://www.b737.org.uk/airconditioning.htm>. p. 2, para [0001], [0002], photo 01, 02, 03.

* cited by examiner

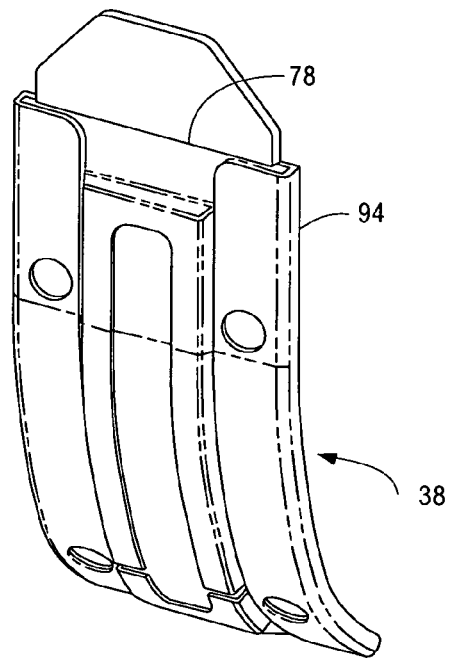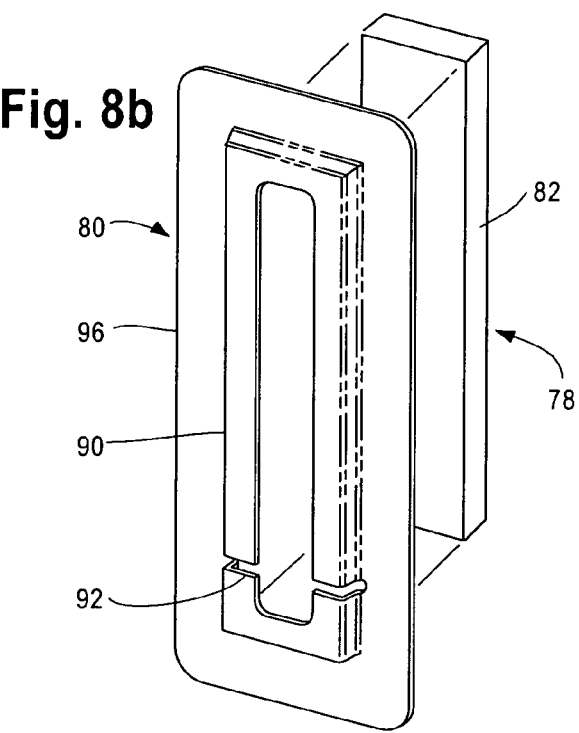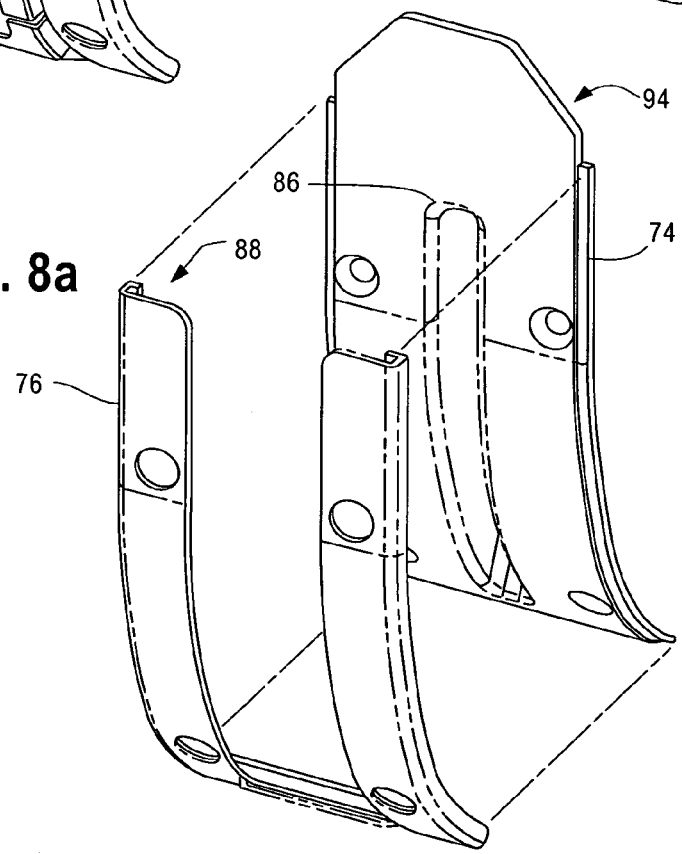

AIRCRAFT CABIN TEMPERATURE SENSOR FILTER

FIELD OF THE INVENTION

The field of the invention relates to commercial aircraft and more particularly to methods of conditioning the air within a commercial aircraft.

BACKGROUND OF THE INVENTION

The conditioning of air within commercial aircraft is an important feature of commercial aviation. While an aircraft remains on the ground in the hot sun, the air within the aircraft must be cooled in order to maintain passenger comfort. However, when the aircraft is at altitude (e.g., 30,000 feet), the air outside may be below zero. In this case, the air within the aircraft must be heated.

Because of the extreme conditions under which an aircraft operates, the air conditioning system must be robust and able to operate under great temperature differences. On the other hand, anything within an aircraft must be as small and lightweight as possible in order to reduce fuel costs.

In order to distribute the conditioned air through the aircraft, most aircraft are provided with an adjustable air vent located above each passenger seat. This allows passengers to easily change the flow of air as required to maintain a comfort level acceptable to the passenger.

Because of the adjustable air vents, the most practical location for air conditioning ducting is in the ceiling. However, most aircraft require overhead bins for storing carry-on luggage. As such, the ducting for distributing conditioned air must be located behind or above the bins.

One of the requirements for the properly conditioning the air within an airplane is the proper detection of cabin temperature. However, the cramped nature of the aircraft cabin does not lend itself to the easy use of thermostats or other temperature sensing devices. Because of the importance of commercial aviation and passenger comfort, a need exists for better methods of controlling aircraft cabin temperatures.

SUMMARY

A method and apparatus are provided for detecting a temperature of a cabin within an airplane. The method includes the steps of providing a temperature sensor, enclosing the temperature sensor within an enclosure, coupling an inlet of the enclosure to the cabin of the airplane and an outlet to an air conditioning air return of the airplane and disposing a filter over the inlet.

In another aspect, the apparatus for detecting a temperature of a cabin within an airplane includes a temperature sensor, an enclosure enclosing the temperature sensor within an enclosure with an inlet of the enclosure coupled to the cabin of the airplane and an outlet coupled to an air conditioning air return of the airplane and a filter disposed over the inlet.

In another aspect, the apparatus for detecting temperature further includes the temperature sensor enclosure disposed at a rear of a plurality of luggage bins extending along a length of and on either side of the airplane.

In another aspect, the apparatus for detecting temperature further includes the inlet disposed in a space between directly adjacent doors of the plurality of luggage bins and a slot in a front face of a dividing wall of the luggage bin structure with a longitude of the slot extending parallel to the space between the directly adjacent doors.

In another aspect, the apparatus for detecting temperature further includes a filter frame disposed over the filter with a central slot coaxial with the inlet slot that secures the filter to the front face.

In another aspect, the apparatus for detecting temperature further includes a longitude and width of the central slot of the filter frame substantially equal to the slot of the inlet.

In another aspect, the apparatus for detecting temperature further includes a U-shaped filter frame disposed over the filter with a notch extending along opposing inside rear edges of a pair of upright arms of the U-shaped filter frame, wherein the filter fits between the upright arms within the notches thereby forming a relatively loose fitting pocket for the filter with an open top between the front face and filter frame wherein the filter may be removed and replaced through the open top without tools.

In another aspect, the apparatus for detecting temperature further includes a filter plate that supports the filter during insertion into the pocket.

In another aspect, the apparatus for detecting temperature further includes a filter frame disposed over the filter and a set of spacers extending along opposing sides of the slot and along a bottom of the slot, said filter frame having a central slot coaxial with the slot of the inlet and wherein the filter frame extends over the filter and is mounted to the spacers on opposing sides thereby forming a relatively loose fitting pocket for the filter with an open top between the front face and filter frame wherein the filter may be removed and replaced through the open top without tools.

BRIEF DESCRIPTION OF THE DRAWINGS

FIG. 7 depicts the filter assembly of FIG. 4 under an alternate embodiment;

FIGS. 8a-b show exploded view of the filter assembly of FIG. 7 and

DETAILED DESCRIPTION OF AN ILLUSTRATED EMBODIMENT

Figure 1:
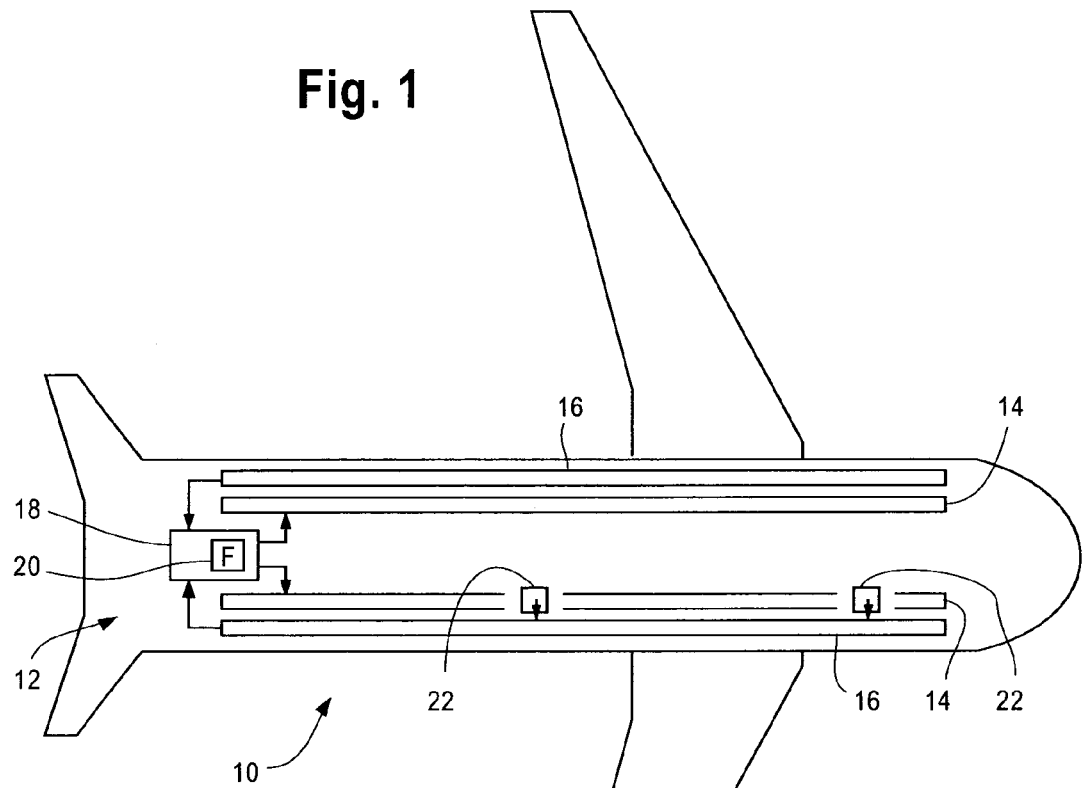
FIG. 1 is a simplified block diagram of an aircraft shown generally in accordance with an illustrated embodiment of the invention.

FIG. 1 is a simplified block diagram of an aircraft 10 shown generally in accordance with an illustrated embodiment of the invention. Shown within the aircraft 10 is an air conditioning system 12. Included within the air conditioning system 12 is a set of supply air ducts 14 and a set of return ducts 16. Connected between the supply ducts 14 and return ducts 16 is a heating/cooling device 18. The heating/cooling device 18 may be a conventional aircraft heating/cooling device with a fan 20.

Also included within the aircraft 10 of FIG. 1 is one or more temperature sensors 22 that are used to control a temperature of conditioned air provided by the heating/cooling unit 18. In order to reduce the possibility of damage, the temperature sensors 22 are located (FIG. 2) behind the aircraft luggage bins 24 between the luggage bins 24 and an outside surface of the aircraft 10. However, locating the temperature sensors 22 behind the luggage bins 24 increases the possibility of erroneous temperature readings because the sensor 22 is located near the outside surface 28 of the aircraft 10. In order to reduce the possibility of erroneous readings, the sensor 22 is surrounded by a bleed assembly 28 that bleeds cabin air 26 past the sensor 22 and into the return air duct 16.

The bleed assembly 28 includes a chamber 30 located behind the luggage bins 24. A small tube 32 may connect a first side of the chamber 30 to a slot 34 between a set of doors 36 on the luggage bins 24. Another small tube with a restriction 32 may connect the second side of the chamber 30 to the return air duct 16.

The bleed assembly 28 is not a return air duct because its purpose is not to transport return air from the cabin to the return air duct 16. The only purpose of the bleed assembly 28 is to ensure that a small amount of cabin air 26 (e.g., few milliliters of air per second) passes over the sensor 22. The restriction 32 restricts the air flow through the chamber 30 to the minimum amount necessary to ensure an accurate temperature measurement of the cabin air 26.

Figure 2:
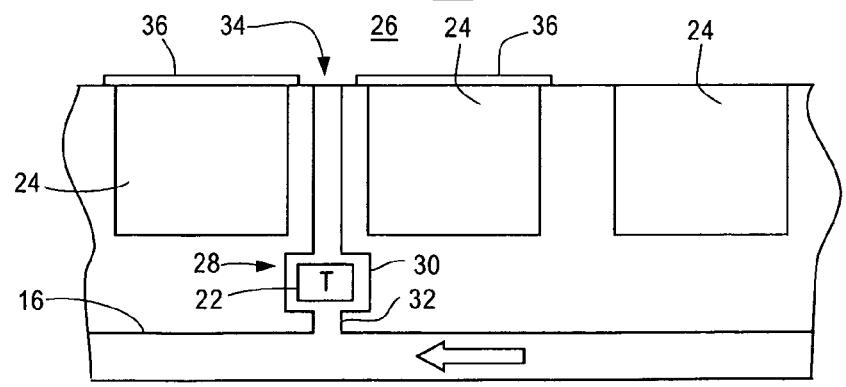
FIG. 2 is a block diagram of a temperature sensor system that may be used by the aircraft of FIG. 1.
Figure 3:
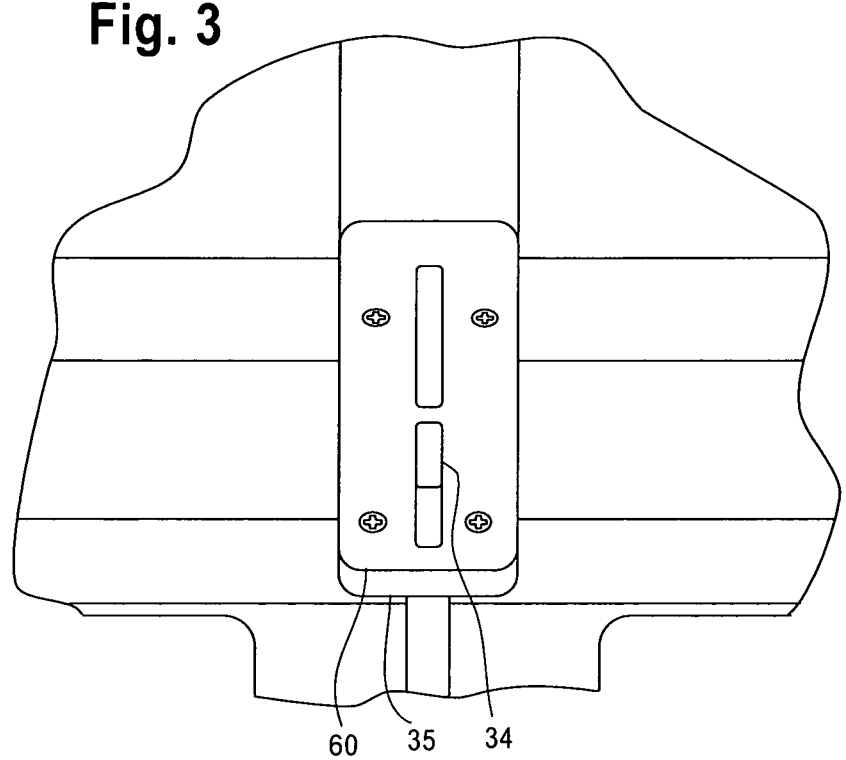
FIG. 3 is an inlet slot for the temperature sensor of FIG. 2.

FIG. 3 is a front view of the slot 34 of FIG. 2 located on a front surface 35 of a divider wall between bins 24. As shown, the slot 34 may have a longitude of approximately 4 inches and a width of approximately one-quarter inch.

Figure 4:
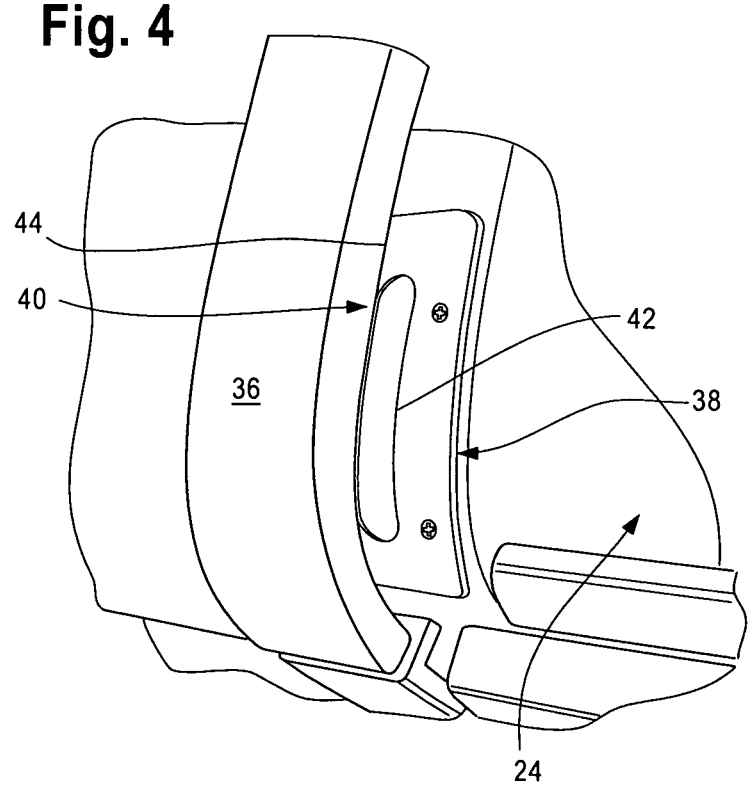
FIG. 4 shows a filter assembly disposed over the inlet slot of FIG. 3.

FIG. 4 shows the slot 34 of FIG. 3 covered by a filter assembly 38. As shown in FIG. 4, the filter assembly 38 includes a front cover 44 with a slot 40. The slot 40 of the front cover 44 may be coaxial with the slot 34 of the tube 32. Behind the front cover 44 and visible through the slot 40 is a filter 42. As shown in FIG. 4, when the doors 36 of the bins 24 are closed, the doors 36 substantially cover the filter assembly leaving only the slot 40 and underlying filter 42 exposed to the cabin air 26.

Figure 5:
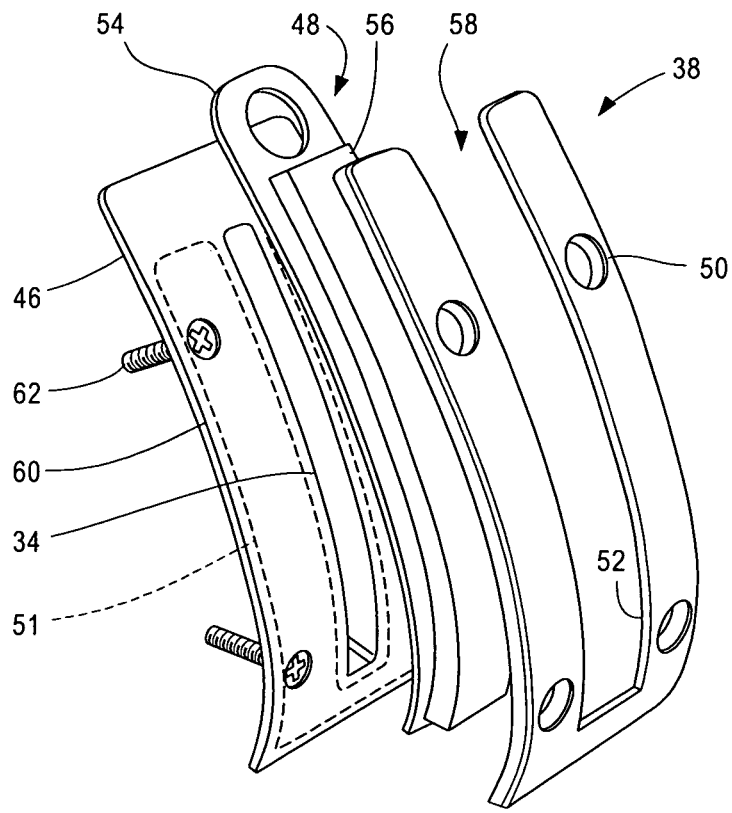
FIG. 5 depicts an exploded view of the filter assembly of FIG. 4 under a first illustrated embodiment.

FIG. 5 is an exploded front perspective view of the filter assembly 38 under a first illustrated embodiment. As shown, the filter assembly 38 may include a curved mounting plate 60, a filter cartridge 48 and a U-shaped front cover or bezel 50. As shown, a mounting plate 60 may be secured over the slot 34 with screws 62 extending through the mounting plate 60 and into the front surface 35 of the divider wall between bins 24. The U-shaped front cover 50 may include a notch or notches 52 extending along the inside, rear edges of the two upright arms of the front cover 50 between a front surface of the front cover 50 and mounting plate 60.

The U-shaped front cover 50 can be constructed by machining the notch 52 into the rear edge of the upright arms. Alternatively, the notch 52 may be created by spacers 51. In this case, a set of spacers 51 may be attached to the mounting plate 60 around the slot 34 where the distance between the upright spacers 51 is greater than the size of the slot 34 in order to allow room for the filter media 56 to overlap the slot 34. In this case the front cover 50 may be attached over the spacers 51.

The filter cartridge 48 may be supported by a flexible plate 54 with a center slot (not shown) where the center slot has substantially the same dimensions as the slot 34 and where the slot of the flexible plate 54 is covered by filter media 56. A width of the filter media 48 may be substantially equal to the distance between the upright arms of the front cover 50. When mounted to the mounting plate 60, the opposing notches 52 (in opposing arms of the front cover 50) and space between the opposing arms form a pocket 58 that the filter cartridge 48 can be inserted into without tools. In this regard, the depth of the notches 52 (perpendicular to the front surface 35) on opposing sides of the space between the upright arms are slightly larger (e.g., a few millimeters) that the thickness of the flexible plate 54 that supports the filter media 56. Similarly, the distance between opposing sides of the notches 52 on the opposing upright arms (parallel to the surface 35) is slightly larger (e.g., a few millimeters) than the width of the flexible plate 54.

Figure 6:
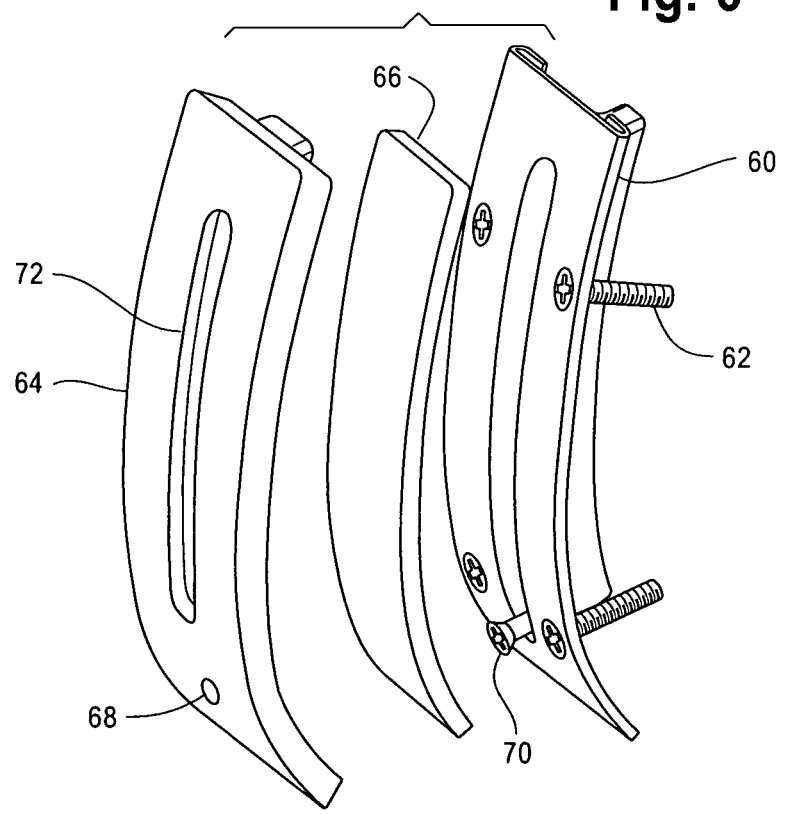
FIG. 6 depicts an exploded view of the filter assembly of FIG. 4 under a second illustrated embodiment.

FIG. 6 shows another illustrated embodiment of the filter assembly 38. Under this embodiment, the front cover 64 includes a central slot 72 with the same dimensions as the slot 34. A filter media 66 is cut to a size that is slightly larger than the slots 34 and 72. The front cover 64 secures the filter media 66 over the slot 34 via screws 70. As above, the slot 72 is coaxial with the slot 34 and with the filter media 66 substantially covering the slot 34.

FIGS. 7-9 depict the filter assembly 38 under still another illustrated embodiment of the invention. FIG. 7 shows a front perspective view of the filter assembly 38. FIG. 8a shows an exploded view of the filter holder 94 including a mounting plate 74 and bezel 76 and FIG. 8b shows an exploded view of the filter cartridge 78. FIGS. 9a-d show front, side and cut-away views of the filter 38.

Figure 9D:
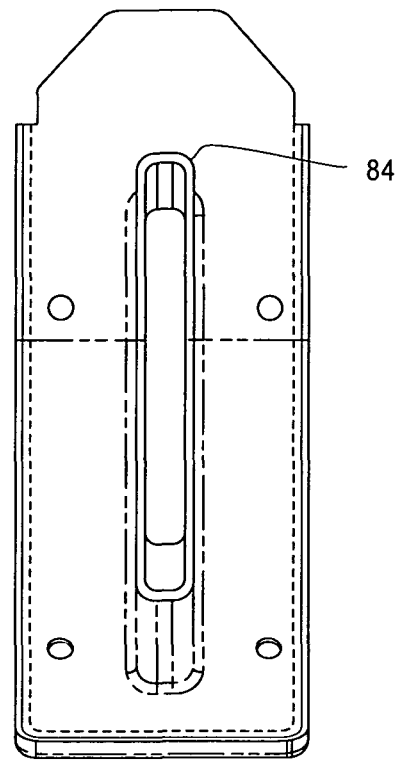
FIGS. 9a-c show front, side and cut-away views of the filter assembly of FIG. 7.
Figure 9C:
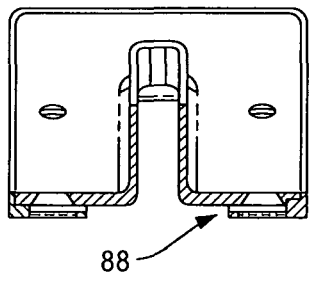
Figure 9A:
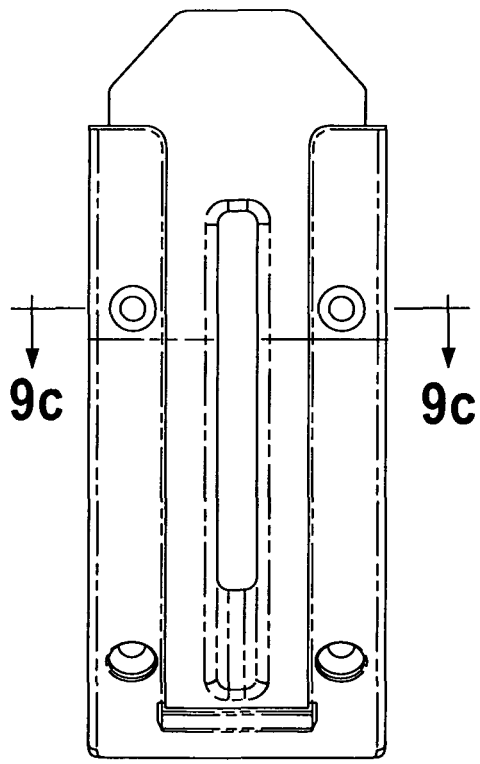
Figure 9B:
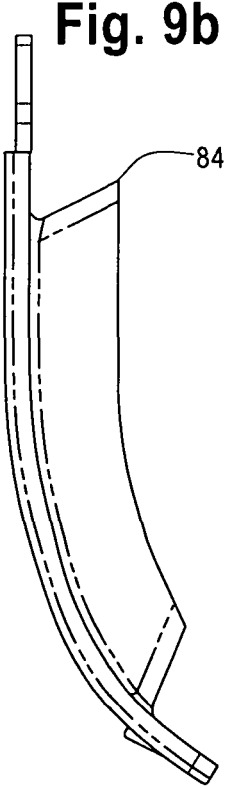

As shown in FIG. 8a, the mounting plate 74 has a front surface that is curved to conform to the vertical surface between the doors 36 of the luggage bins 24. FIGS. 9b and 9d shows a stub duct 84 that extends from around the aperture 86 in the mounting plate 74 and into the bleed line leading to the sensor 22.

As shown in the exploded view of FIG. 8a, the front bezel 76 is U-shaped where the upright arms are located on opposing sides of the aperture 86. A notch 88 on the inside back surfaces of the upright arms are provided to receive a set of flanges 96 on opposing sides of the filter cartridge 78. As shown in the cut-away view of FIG. 9c, the notch 88 may have a slot width of approximately 0.040 inches.

The filter cartridge 78 shown in the exploded view of FIG. 8b includes a mounting plate 80 and filter media 82. The mounting plate 80 shows a stepped recess formed in the back side of the mounting plate 80 that surrounds the aperture thereby defining a recessed area centered on the aperture and that receives the filter media 82. The stepped recess (shown as a stepped protrusion 90 in the front view of FIG. 8b) has a width that easily fits between the upright arms of the bezel 76.

The protrusion 90 may include one or more slots 92 cut into and extending across the projection 90 perpendicular to a direction of insertion of the cartridge 78 into the filter assembly 38. The slots 92 allow the filter cartridge 78 to easily flex during insertion of the cartridge 78 into the assembly 38.

The filter assembly 38 functions to improve the reliability of the temperature sensor 22 by solving a problem that has not been recognized in the aircraft industry. For example, pulling bleed air over the sensor 22 to accurately sense cabin temperature also pulls dust and debris from the cabin across the sensor 22 thereby reducing the accuracy of the sensor 22. In some cases, the dust and debris may short-out the sensor 22 thereby rendering the sensor 22 inoperable. By placing the filter sensor 38 over the inlet to the sensor 22, the accuracy and reliability of the sensor 22 is increased considerably.

A specific embodiment of method and apparatus for sensing cabin temperature in an aircraft has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. An apparatus comprising:
   a mounting plate mounted on a spacer adjacent overhead luggage bins of an aircraft; said mounting plate having a center aperture, a curved profile in a first direction that conforms to a vertical curve on the spacer between adjacent overhead luggage bins of the aircraft and a width in a second direction that fits between doors of the overhead luggage bins;
   a U-shaped bezel that engages the mounting plate, the bezel defining a pair of notches between the bezel and the mounting plate along opposing inside edges of a pair of upright arms of the U-shaped bezel; and
   a filter cartridge with a pair of opposing flanges that engages the notches and a filter media over a central portion that covers the aperture in the mounting plate.

2. The apparatus as in claim 1 wherein the filter cartridge further comprises a relatively flat body with a center aperture, a recessed area extending into the flat body around the aperture, a filter disposed over the aperture and within the recess, and the pair of flanges being along opposing sides of the flat body and engaging, respectively, the pair of notches between the bezel and the mounting plate during insertion of the filter cartridge.

3. The apparatus as in claim 2 further comprising a slot in the recess transverse to a direction of insertion that allows the filter cartridge to bend during the insertion.

\* \* \* \* \*